United States Patent
Wang

(10) Patent No.: US 6,541,084 B2
(45) Date of Patent: Apr. 1, 2003

(54) VACUUM IG WINDOW UNIT WITH POLYMER SPACERS

(75) Inventor: Yei-Ping (Mimi) H. Wang, Troy, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 6 days.

(21) Appl. No.: 09/775,800

(22) Filed: Feb. 5, 2001

(65) Prior Publication Data

US 2002/0106463 A1 Aug. 8, 2002

(51) Int. Cl.[7] .............................. E06B 3/24; E04C 2/54
(52) U.S. Cl. ....................................... 428/34; 52/786.13
(58) Field of Search ........................... 428/34, 120, 192; 52/786.1, 786.13

(56) References Cited

U.S. PATENT DOCUMENTS

| | | | |
|---|---|---|---|
| 3,441,924 A | * | 4/1969 | Peek et al. ..................... 428/34 |
| 3,990,201 A | | 11/1976 | Falbel |
| 4,130,408 A | | 12/1978 | Crossland et al. |
| 4,683,154 A | | 7/1987 | Benson et al. |
| 4,786,344 A | | 11/1988 | Beuther |
| 4,928,448 A | | 5/1990 | Phillip |
| 5,005,557 A | | 4/1991 | Bächli |
| 5,124,185 A | | 6/1992 | Kerr et al. |
| 5,270,084 A | * | 12/1993 | Parker ......................... 428/34 |
| 5,643,644 A | | 7/1997 | Demars |
| 5,657,607 A | | 8/1997 | Collins et al. |
| 5,664,395 A | | 9/1997 | Collins et al. |
| 5,855,638 A | | 1/1999 | Demars |
| 5,891,536 A | | 4/1999 | Collins et al. |
| 5,902,652 A | | 5/1999 | Collins et al. |
| 6,065,195 A | | 4/2000 | Collins et al. |
| 6,071,575 A | | 6/2000 | Collins et al. |
| 6,083,578 A | | 7/2000 | Collins et al. |
| 6,103,324 A | | 8/2000 | Collins et al. |

FOREIGN PATENT DOCUMENTS

FR    2 482 161    11/1981

* cited by examiner

Primary Examiner—Donald J. Loney
(74) Attorney, Agent, or Firm—Nixon & Vanderhye P.C.

(57) ABSTRACT

A vacuum insulating glass (IG) unit and method of manufacturing the same. The vacuum IG unit is preferably provided with polymer inclusive spacers for spacing the substrates from one another. In certain embodiments, the spacers may be of or include a polymer material selected from the group consisting of: polyimide, polyamide, polysiloxane, polyphenylene, polyphenylene oxide, polyaramide (e.g., Kevlar), polysulfone, and polycarbonate.

5 Claims, 2 Drawing Sheets

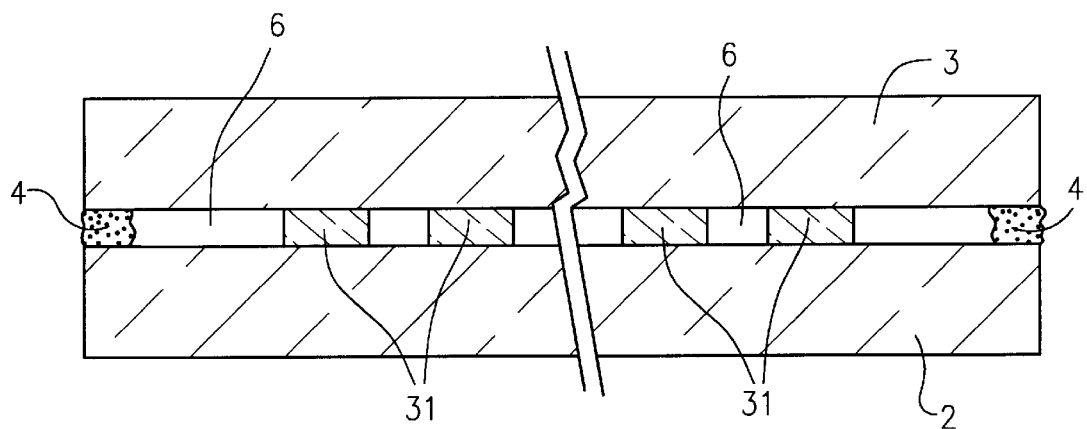
FIG. 3
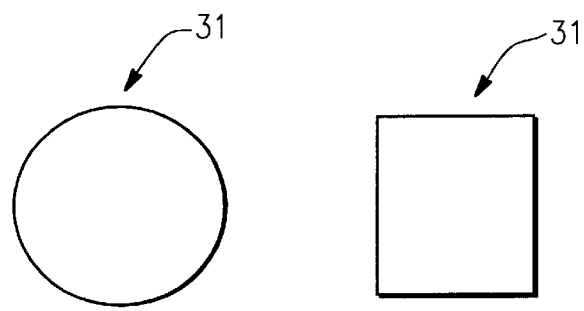
FIG. 4(a)　　　　　FIG. 5(a)
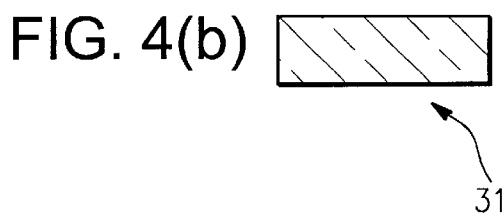　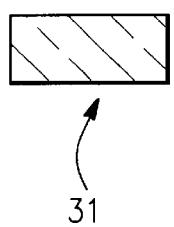
FIG. 4(b)　　　　　FIG. 5(b)

VACUUM IG WINDOW UNIT WITH POLYMER SPACERS

This invention relates to a vacuum insulating glass (IG) unit with polymer inclusive spacers.

BACKGROUND OF THE INVENTION

Vacuum IG units are known in the art. For example, see U.S. Pat. Nos. 5,664,395, 5,657,607, and 5,902,652, the disclosures of which are all hereby incorporated herein by reference.

Prior art FIGS. 1–2 illustrate a conventional vacuum IG unit. IG unit 1 includes two spaced apart glass substrates 2 and 3 which enclose an evacuated or low pressure space 6 therebetween. Glass sheets/substrates 2 and 3 are interconnected by peripheral or edge seal of fused solder glass 4 and an array of support pillars or spacers 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space 6. After evacuation, tube 8 is melted to seal the vacuum. Recess 11 retains sealed tube 8. Optionally, a chemical getter 12 may be included within recess 13.

U.S. Pat. No. 5,644,395 discloses that spacers 5 are made of solder glass, glass, ceramic, or metal.

Unfortunately, these materials tend to be very hard and rigid, thereby leading to a potential for glass cracks in the substrates proximate the spacers/pillars. The potential for substrate cracking proximate the spacers/pillars may be reduced by tempering the glass substrates, but this is expensive.

It will be apparent to those of skill in the art that there exists a need for a vacuum IG unit, and corresponding method of making the same, where the spacers are made of a flexible material that reduces the potential for glass cracking but which can withstand the atmospheric pressure outside the unit causing compression thereof.

SUMMARY OF THE INVENTION

An object of this invention is to provide a vacuum IG unit with polymer inclusive spacers.

Another object of this invention is to provide a vacuum IG unit with flexible spacers, which reduce the likelihood of glass cracking proximate the spacers.

Another object of this invention is to fulfill one or more of the above listed objects and/or needs.

Generally speaking, this invention fulfills one or more of the above listed needs and/or objects by providing thermally insulating panel comprising:

first and second spaced apart glass substrates having a low pressure space therebetween having a pressure less than atmospheric pressure;

a hermetic seal provided between said first and second substrates for sealing off said low pressure space; and a plurality of polymer inclusive spacers provided between said first and second substrates for spacing the substrates from one another.

In certain embodiments, the spacers are of or comprise a polymer selected from the group consisting essentially of: polyimide, polyamide, polyether-imide, polysiloxane, polyphenylene, polyphenylene oxide, polyaramide, polysulfone, and polycarbonate.

In certain embodiments, do not melt or physically deform to any significant extent upon exposure to temperatures up to 350 degrees C., more preferably up to 290 degrees C.

IN THE DRAWINGS

FIG. 3 is a partial side cross sectional view of a vacuum IG unit according to an embodiment of this invention.

FIG. 4(a) is a top plan view of a spacer according to an embodiment of this invention, that may be used in the FIG. 3 vacuum IG unit.

FIG. 4(b) is a side cross sectional view of the spacer of FIG. 4(a).

FIG. 5(a) is a top plan view of a spacer according to another embodiment of this invention, that may be used in the FIG. 3 vacuum IG unit.

FIG. 5(b) is a side cross sectional view of the spacer of FIG. 5(a).

DETAILED DESCRIPTION OF CERTAIN EMBODIMENTS OF THIS INVENTION

Figure 2:
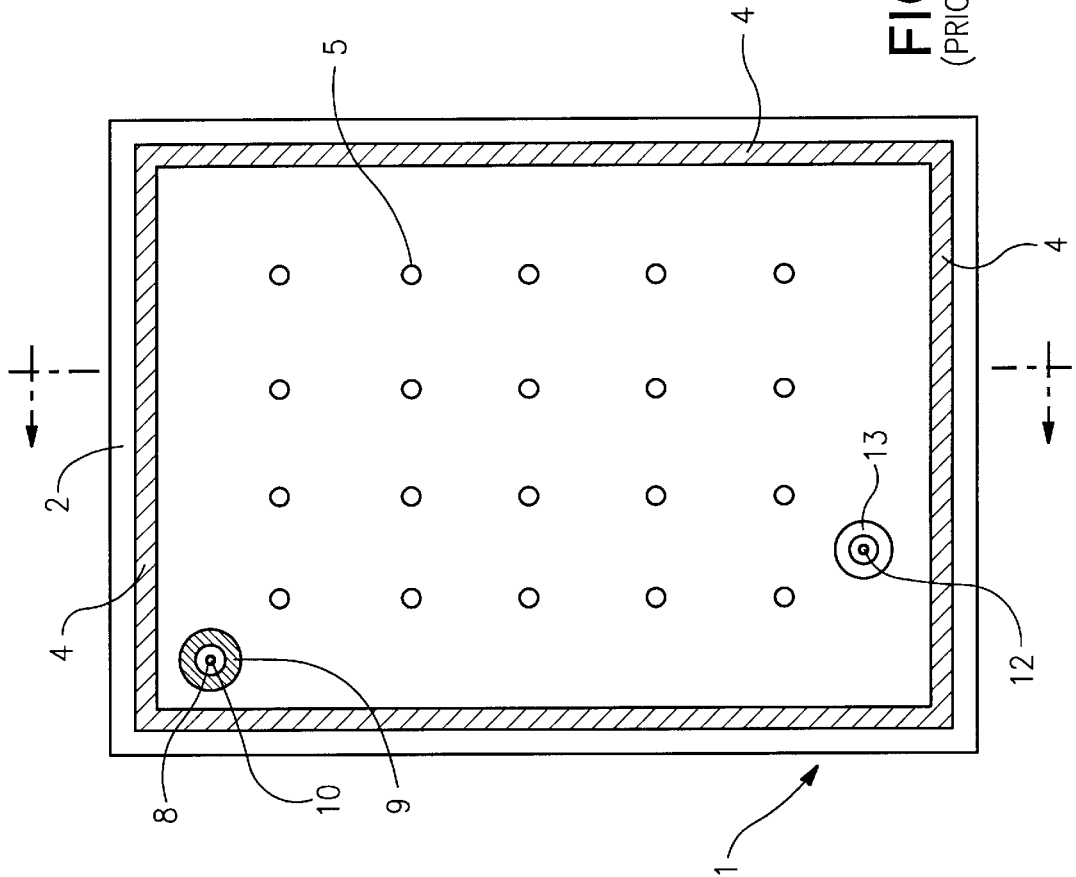
FIG. 2 is a prior art top plan view of the bottom substrate, edge seal, and spacers of the FIG. 1 vacuum IG unit taken along the section line illustrated in FIG. 1.
Figure 1:
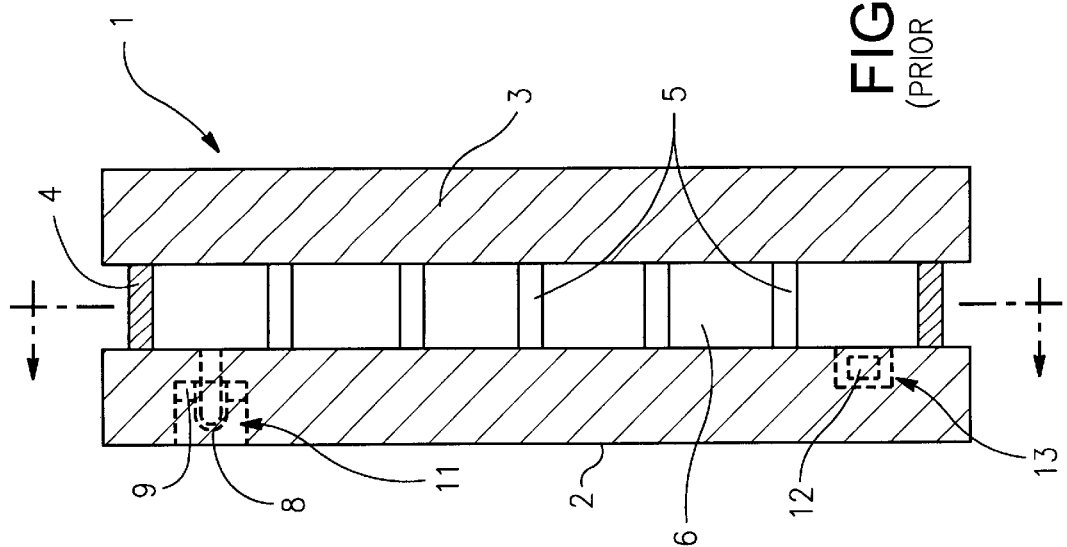
FIG. 1 is a prior art cross-sectional view of a conventional vacuum IG unit.

Referring now more particularly to the accompanying drawings in which like reference numerals indicate like parts throughout the several views.

Certain embodiments of this invention relate to polymer inclusive spacers in a vacuum IG window unit including a hermetic peripheral or edge seal, and/or a method of making the same. "Peripheral" and "edge" seals herein do not mean that the seals are located at the absolute periphery or edge of the unit, but instead mean that the seal is at least partially located at or near (e.g., within about two inches) an edge of at least one substrate of the unit.

In certain embodiments of this invention, vacuum IG spacer(s) 31 are made of or include a polymer material selected from the group consisting essentially of: polyimide, polyamide, polysiloxane, polyphenylene, polyphenylene oxide, polyaramide (e.g., Kevlar), polysulfone, polyether-imide and polycarbonate. An exemplary polymer of which spacers 31 may be made is Ultem, available from GE Plastics. Other polymers may also be used in certain embodiments of this invention. Preferably, such polymers are somewhat flexible and reduce the potential for glass cracks in vacuum IG units proximate the pillars. As a result, while tempered glass sheets can still be used in certain embodiments of this invention as the IG substrates 2, 3, this invention enables tempered sheets to be avoided in certain embodiments. Vacuum IG units with polymer spacers may also be more impact resistant.

While polymer spacers 31 are preferred, these spacers (and thus the polymer from which they are made) must not melt or physically deform to any significant extent upon exposure to temperatures up to 350 degrees C., more preferably up to 290 degrees C., and most preferably up to 275 degrees C. Such temperatures are often needed during the manufacture of vacuum IG units (e.g., for creation of the solder glass edge seal).

FIG. 3 is a partial cross-sectional view of a thermally insulating glass panel according to an embodiment of this invention. The vacuum IG unit of FIG. 3 includes first and second glass substrates 2, 3, edge seal 4 (e.g., of solder glass, indium, or the like), and an array of spacers 31 for spacing the substrates 2, 3 from one another in order to define space or cavity 6 therebetween. Because interior space or cavity 6 between the opposing substrates is at a pressure lower than atmospheric in general, this type of panel is often referred to as a vacuum insulating glass (IG) unit having low pressure space 6. An optional pump out tube (not shown) may be disposed in a hole or aperture formed in one of the substrates for evacuating space 6. Hermetic edge seal 4 prevents air from entering space 6 and keeps the vacuum therein. Seal 4 in certain embodiments of this invention may be located in approximately the same location as edge seal 4 shown in FIG. 2. Any other suitable location is possible so long as a low pressure space 6 is sealed off between the substrates. Substrates 2, 3 may be thermally tempered or simply annealed glass in different embodiments of this invention. Plastic substrates are also possible in less preferred embodiments.

In certain embodiments of this invention, glass substrates 2, 3 may be approximately the same size. However, in other embodiments of this invention, one glass substrate 2 may be larger in size than the other glass substrate 3 in order to provide an approximately L-shaped step proximate an edge of the vacuum IG unit.

Vacuum IG units according to different embodiments of this invention may be used as residential or commercial windows. The evacuation of space 6 eliminates or reduces heat transport between glass substrates 2, 3 due to gaseous conduction and convection. In addition, radiative heat transport between glass sheets/substrates 2 and 3 can be reduced to a low level by providing an optional low emissivity (low-E) coating(s) on the internal surface of one or both substrates 2, 3. Such low-E coating(s) are typically edge deleted under edge seals, but need not be in certain embodiments of this invention. High levels of thermal insulation can thus be achieved. In certain embodiments, the pressure in space 6 is reduced to a level below about $10^{-2}$ Torr, more preferably below about 1.0 mTorr, or $10^{-3}$ Torr, and most preferably below about $10^{-4}$ Torr of atmospheric pressure. To maintain such pressures, the internal surfaces of glass substrates 2, 3 may be outgassed, and areas at or near the edges or peripheries of substrates 2, 3 hermetically sealed together by seal 4 in order to eliminate any ingress of gas or air.

An array of small polymer inclusive spacers 31 is provided between substrates 2 and 3 in order to maintain separation of the approximately parallel glass substrates against atmospheric pressure. It is often desirable for spacers 31 to be sufficiently small so that they are visibly unobtrusive. In certain embodiments, each spacer 31 may have a height of from about 0.20 to 1.0 mm, more preferably from about 0.20 to 0.40 mm. Spacers 31 preferably comprise polymer material so that they may be flexible in some embodiments. In certain embodiments of this invention, spacers 31 are made of or include a polymer selected from the group consisting of: polyimide, polyamide, polysiloxane, polyphenylene, polyphenylene oxide, polyaramide (e.g., Kevlar), polysulfone, and polycarbonate. The use of polymer spacers (which may be flexible upon evacuation of the space 6 and atmospheric pressure outside the unit causing spacer 31 compression as the glass substrates 2, 3 move toward one another) reduces the likelihood of glass cracks in substrates 2, 3 near the spacer locations. Moreover, the use of polymer spacers enables non-tempered glass substrates to be used in certain embodiments.

According to certain embodiments of this invention, the glass used for substrates 2 and 3 is soda lime silica glass. However, other types of glass, colored or clear, may also be used (e.g., borosilicate glass). Glass substrates 2 and/or 3 may be from about 2 to 6 mm thick in certain embodiments, preferably from about 3-5 mm thick each. However, when tempered, thinner glass sheets 2, 3 may be used (e.g., from about 2.5 to 4.0 mm thick). It is also possible to use plastic substrates 2, 3 in alternative embodiments of this invention.

FIG. 4(a) is a top plan view of a spacer 31 according to one embodiment of this invention; where FIG. 4(b) is a side cross sectional view of this same spacer 31. As can be seen, the spacer is solid cross sectionally inside its entire perimeter, and is approximately disc or dime shaped.

FIG. 5(a) is a top plan view of a spacer 31 according to another embodiment of this invention. FIG. 5(b) is a side cross sectional view of the spacer 31 of FIG. 5(a). As can be seen, the spacer is solid cross sectionally inside its entire perimeter, and is rectangular in shape when viewed from above. Moreover, the spacers of FIGS. 4 and 5 are larger in size laterally (i.e., width) than they are in height as viewed from the side (e.g., FIGS. 4(b) and 5(b)). Preferably, they are at least twice as larger in size laterally (i.e., width) than they are in height as viewed from the side.

Once given the above disclosure, many other features, modifications, and improvements will become apparent to the skilled artisan. Such other features, modifications, and improvements are therefore considered to be a part of this invention, the scope of which is to be determined by the following claims.

What is claimed is:

1. A thermally insulating panel comprising:
 first and second spaced apart glass substrates having a low pressure space therebetween having a pressure less than atmospheric pressure;
 a hermetic seal provided between said first and second substrates for sealing off said low pressure space; and
 a plurality of polymer inclusive spacers provided between said first and second substrates for spacing the substrates from one another, wherein said spacers comprise at least one polymer selected from the group consisting essentially of: polysiloxane, polyphenylene, polyphenylene oxide, polyaramide, and polysulfone.

2. The thermally insulating panel of claim 1, wherein said spacers do not melt or physically deform to any significant extent upon exposure to temperatures up to 350 degrees C.

3. The thermally insulating panel of claim 2, wherein said spacers do not melt or physically deform to any significant extent upon exposure to temperatures up to 290 degrees C.

4. The thermally insulating panel of claim 3, wherein said spacers do not melt or physically deform to any significant extent upon exposure to temperatures up to 275 degrees C.

5. The thermally insulating panel of claim 1, wherein said hermetic seal is an edge seal and comprises solder glass.

\* \* \* \* \*